(12) United States Patent
Capes et al.

(10) Patent No.: US 11,693,706 B2
(45) Date of Patent: Jul. 4, 2023

(54) SYSTEM AND METHOD FOR DYNAMIC SCHEDULING OF DISTRIBUTED DEEP LEARNING TRAINING JOBS

(71) Applicant: SAMSUNG ELECTRONICS CO., LTD., Gyeonggi-do (KR)

(72) Inventors: Timothy Capes, Toronto (CA); Iqbal Mohomed, Toronto (CA); Vishal Raheja, Vancouver (CA); Mete Kemertas, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 889 days.

(21) Appl. No.: 16/690,999

(22) Filed: Nov. 21, 2019

(65) Prior Publication Data

US 2020/0159589 A1    May 21, 2020

Related U.S. Application Data

(60) Provisional application No. 62/770,377, filed on Nov. 21, 2018.

(51) Int. Cl.
*G06F 9/50* (2006.01)
*G06V 10/82* (2022.01)
(Continued)

(52) U.S. Cl.
CPC .......... *G06F 9/5038* (2013.01); *G06F 9/5061* (2013.01); *G06F 18/214* (2023.01);
(Continued)

(58) Field of Classification Search
None
See application file for complete search history.

(56) References Cited

U.S. PATENT DOCUMENTS 6,272,483 B1 *  8/2001  Joslin ............... G06Q 10/06
706/62
8,185,909 B2    5/2012  Sigal et al.
(Continued)

FOREIGN PATENT DOCUMENTS

CN        107976998 A   *  5/2018
KR       1020190054449 A    5/2019

OTHER PUBLICATIONS

Sergeev, A., et al., "Horovod: fast and easy distributed deep learning in TensorFlow", Cornell Archive Paper (available at arXiv.org), arXiv:1802.05799v3 [cs.LG], Feb. 21, 2018, pp. 1-10.
(Continued)

*Primary Examiner* — Abu Zar Ghaffari
(74) *Attorney, Agent, or Firm* — Sughrue Mion, PLLC

(57) ABSTRACT

A scheduling algorithm for scheduling training of deep neural network (DNN) weights on processing units identifies a next job to provisionally assign a processing unit (PU) based on a doubling heuristic. The doubling heuristic makes use of an estimated number of training sets needed to complete training of weights for a given job and/or a training speed function which indicates how fast the weights are converging. The scheduling algorithm solves a problem of efficiently assigning PUs when multiple DNN weight data structures must be trained efficiently. In some embodiments, the training of the weights uses a ring-based message passing architecture. In some embodiments, performance using a nested loop approach or nested loop fashion is provided. In inner iterations of the nested loop, PUs are scheduled and jobs are launched or re-started. In outer iterations of the nested loop, jobs are stopped, parameters are updated and the inner iteration is re-entered.

17 Claims, 8 Drawing Sheets

(51) Int. Cl.

| | |
|---|---|
| *G06N 3/08* | (2023.01) |
| *G06N 7/08* | (2006.01) |
| *G06F 18/214* | (2023.01) |
| *G06N 5/01* | (2023.01) |
| *G06V 10/764* | (2022.01) |
| *G06V 10/94* | (2022.01) |
| *G06V 10/96* | (2022.01) |
| *G06N 3/084* | (2023.01) |

(52) U.S. Cl.
CPC ............... *G06N 3/08* (2013.01); *G06N 3/084* (2013.01); *G06N 5/01* (2023.01); *G06N 7/08* (2013.01); *G06V 10/764* (2022.01); *G06V 10/82* (2022.01); *G06V 10/955* (2022.01); *G06V 10/96* (2022.01)

(56) References Cited

U.S. PATENT DOCUMENTS

| | | | |
|---|---|---|---|
| 8,904,149 B2 | 12/2014 | Eren et al. | |
| 10,509,997 B1* | 12/2019 | Gupta | .................... G06Q 10/00 |
| 2002/0141689 A1* | 10/2002 | Qian | .................. H04Q 11/0005 |
| | | | 385/18 |
| 2008/0144074 A1* | 6/2008 | Lin | ........................ G06Q 10/06 |
| | | | 358/1.15 |
| 2013/0167154 A1* | 6/2013 | Peng | ..................... G06F 9/5083 |
| | | | 718/105 |
| 2015/0082314 A1* | 3/2015 | Suzuki | ...................... G06F 9/54 |
| | | | 718/102 |
| 2015/0161988 A1* | 6/2015 | Dognin | .................... G06N 3/08 |
| | | | 704/232 |
| 2017/0300811 A1* | 10/2017 | Merhav | .................. G06N 3/084 |
| 2018/0349202 A1 | 12/2018 | Sharma et al. | |
| 2019/0073590 A1* | 3/2019 | Wu | ........................... G06F 9/52 |
| 2019/0332422 A1* | 10/2019 | Liu | ........................ G06F 9/4881 |
| 2019/0332444 A1* | 10/2019 | Prakash | ..................... G06F 9/52 |

OTHER PUBLICATIONS

Peng, Y., et al., "Optimus: An Efficient Dynamic Resource Scheduler for Deep Learning Clusters", Cornell Archive Paper (available at arXiv.org), EuroSys '18, Apr. 23-26, 2018, pp. 1-14.

Goyal, P., et al., "Accurate, Large, Minibatch SGD: Training ImageNet in 1 Hour", Cornell Archive Paper (available at arXiv.org), arXiv:1706.02677v2 [csCV], Apr. 30, 2018, pp. 1-12.

Thakur, R., et al., "Optimization of Collective Communication Operations in MPICH", Cornell Archive Paper (available at arXiv.org),The International Journal of High Performance Computing Applications (IJHPCA), 2005, pp. 1-17.

Rabenseifner, R., "Optimization of Collective Reduction Operations", High-Performance Computing-Center (HLRS), University of Stuttgart, Germany, www.hlrs.de/people/rabenseifner , Bubak, M., et al., (Eds.): ICCS 2004, LNCS 3036, pp. 1-9.

Capes, T., et al., "Dynamic Scheduling of MPI-based Distributed Deep Learning Training Jobs", Cornell Archive Paper (available at arXiv.org), arXiv:1908.08082v1 [cs.LG], Aug. 21, 2019, pp. 1-7.

* cited by examiner

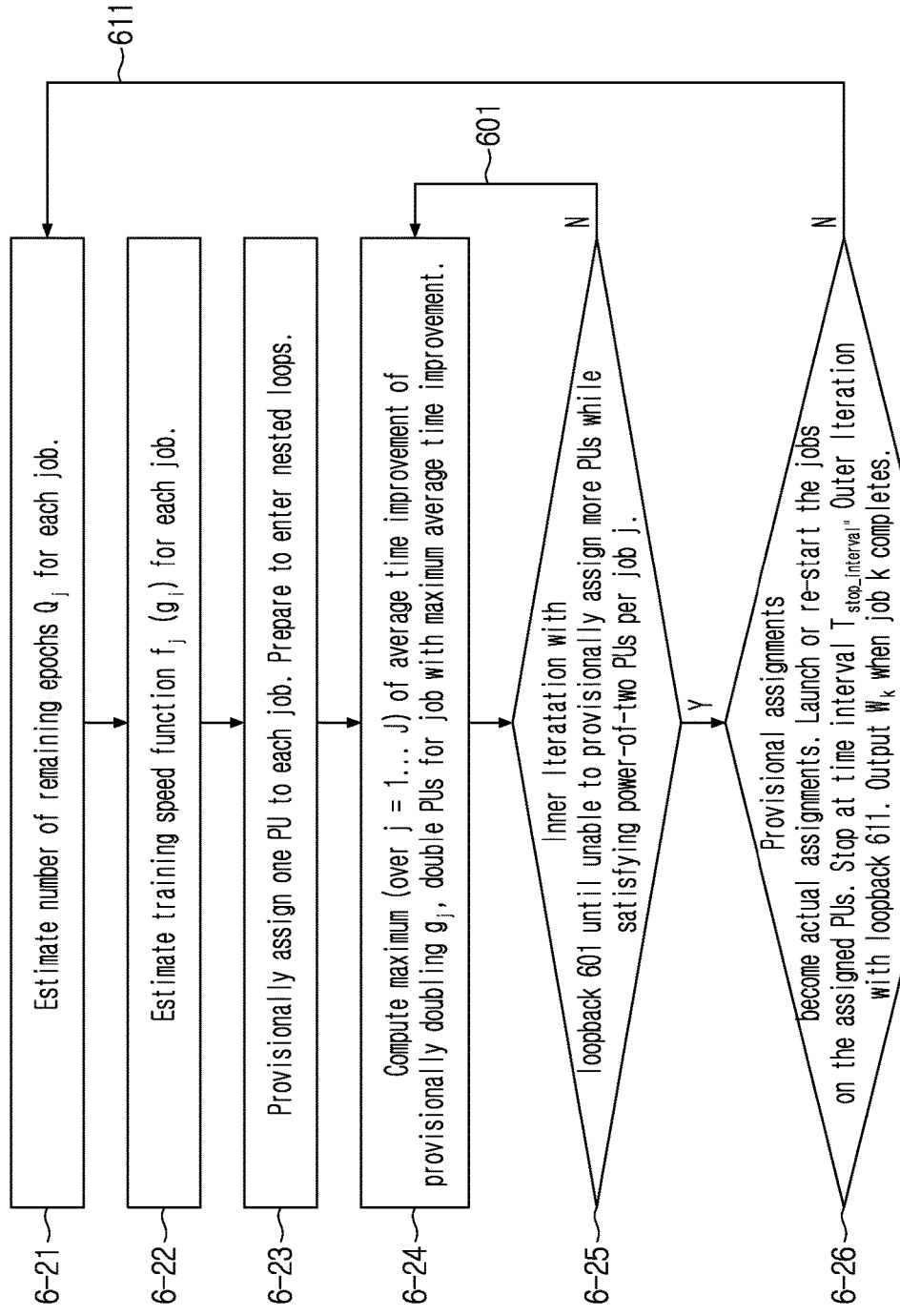

SYSTEM AND METHOD FOR DYNAMIC SCHEDULING OF DISTRIBUTED DEEP LEARNING TRAINING JOBS

CROSS-REFERENCE TO RELATED APPLICATIONS

This application claims the benefit of U.S. Provisional Application No. 62/770,377 filed on Nov. 21, 2018, the contents of which are hereby incorporated by reference.

BACKGROUND

Some training of weights is performed using a technique called ring-allreduce. An example is provided in A. Sergeev and M. Del Balso, "Horovod: fast and easy distributed deep learning in TensorFlow" Cornell Archive index arXiv: 1802.05799v3 (hereinafter "Horovod Paper"). The Horovod Paper presents an approach to implementing a single job using a ring architecture for message passing and a function called allreduce. The Horovod paper does not address problems of scheduling.

As deep learning applications become more pervasive, organizations such as research labs, have continued to make large investments in graphics processing unit (GPU) clusters. A major challenge that follows is the need to better utilize cluster resources. In some instances, scientists may be using GPUs on a single server due to the complexities of multi-server training. Even when a scientist writes code to leverage multiple GPUs, they face the problem of sharing the cluster effectively in the face of contention.

While cluster schedulers have a long history in academia and practice, system support for distributed DL (Deep Learning) training in schedulers is in its infancy. One useful capability is dynamic scheduling, where the resources allocated to a particular training job are updated based on factors such as job priority, contention, resource availability, and overall demand.

An example of a dynamic scheduler is provided in Y. Peng, Y. Bao, Y. Chen, C. Wu and C. Guo, "Optimus: An Efficient Dynamic Resource Scheduler for Deep Learning Clusters," Eurosys 2018, Proceedings of the 13$^{th}$ EuroSys Conference, 2018 (hereinafter "Optimus Paper"). Optimus is a dynamic scheduler for parameter server deep learning jobs written for MXNet. Optimus uses online fitting to model the number of epochs till convergence. It uses resource modelling with non-negative least squares (NNLS) to learn the speed per epoch for p parameter servers and w workers. These are used to formulate a non-linear non-convex NP-hard integer programming problem. This problem is heuristically solved with the greedy heuristic of adding the best projected worker or parameter server at each step. Optimus does not include a ring architecture and Optimus does not use a doubling heuristic.

A major portion of the efficiency gains above is due to increasing use of HPC methods in OpenMPI (Message Passing Interface) and NCCL(NVIDIA Collective Communications Library) for deep learning. NCCL is a collective communications library that enables some efficient algorithms at the GPU level, notably allreduce; which is an efficient way to share loss and gradient vectors across multiple GPUs. See the Nvidia collective communications library at developer.nvidia.com/nccl, 2017. The Horovod Paper uses both NCCL and OpenMPI for all reduce based training of neural network models. Techniques utilizing all reduce have scaled to 512 GPUs and substantially larger minibatch sizes than those using parameter servers. See the Horovod Paper and the Goyal Paper (citation below).

A doubling halving algorithm is introduced in R. Rabenseifner, "Optimization of collective reduction operations," International Conference on Computation Science, 2004 (hereinafter "Rabenseifner Paper"). Allreduce achieves a latency efficient all-to-all copy and sum (all reduce).

Let g be the number of GPU's used by a single job and let n be the size of the gradient tensors being exchanged. The ring algorithm divides the gradient tensors into g segments and copies a segment to each GPU taking g−1 steps and copying 7, data per GPU at each step. This algorithm is efficient for very large data sizes in deep learning. However, it has a tradeoff of having latency that is linear in the number of GPUs. See the Rabenseifner Paper. For parameter sizes up to 107, the doubling-halving algorithm for powers of 2 has been found to be significantly more efficient. See the Horovod Paper.

The doubling-halving algorithm of the Rabenseifner Paper has log(g) steps and at step i, node j would copy the forward or backward half of its current vector to node j+2z−1. For example, at step 1, odd nodes copy the forward half and even nodes copy the backward half. The segments are then combined by taking log(g) steps in reverse, starting by copying at distance w/2 and finishing by copying at distance 1 with each copy doubling in size. This algorithm has low-latency due to fewer requests. However, this only works for powers of 2, otherwise, a variation known as binary blocks is used.

The binary blocks algorithm works in a manner similar to the doubling-halving algorithm but with modifications based on building up blocks of size power of 2. If the number of GPUs is a power of 2 it's identical, otherwise, it represents g as a sum of powers of 2 and executes a similar strategy with some extra steps to aggregate the inexact matches. The binary blocks algorithm is most efficient when there are small differences between the powers of 2 in the sum and does worse when the powers of 2 in the sum have large differences. See the Rabenseifner Paper.

SUMMARY

There is a general trend towards solving problems suited to deep learning with more complex deep learning architectures trained on larger training sets. This requires longer compute times and greater data parallelization or model parallelization. Both data and model parallelism have been historically faster in parameter server architectures, but data parallelism is starting to be faster in ring architectures due to algorithmic improvements.

Some embodiments provided herein adapt dynamic scheduling to ring architectures. The scheduling algorithms provided herein solve a non-convex, non-linear, NP-hard integer programming problem with a new efficient doubling heuristic. Embodiments provided herein use an open source ring architecture framework over TensorFlow. For more details of a ring architecture and TensorFlow, please see the Horovod Paper mentioned above.

In some embodiments, scheduling is performed including stopping and restarting jobs. In some scenarios, stopping and restarting ring architecture jobs leads to faster completion times. Embodiments provided herein show that dynamic scheduling of ring architecture jobs is feasible. Provided herein are simulation results for a scheduler showing improvement of average job time on some workload patterns.

Embodiments provided herein illustrate that dynamic scaling of the number of GPUs available to deep learning tasks is critical to effective utilization of clusters. Embodiments provided herein explore training over ring architectures—as opposed to parameter servers. Ring architectures offer better resource utilization for data parallel workloads.

Provided herein is a method of scheduling a plurality of jobs to a plurality of processing units (PUs), wherein the plurality of jobs includes J jobs, J is two or more, and the plurality of PUs includes C processing units (i.e., the number of PUs may be represented by the integer variable C, resulting in C PUs) and C is two or more, the method comprising: initializing by provisionally assigning one PU to each job of the plurality of jobs; iteratively identifying and provisionally assigning to determine an allocation from the plurality of PUs to the plurality of jobs, wherein the iteratively identifying and provisionally assigning, within an iteration, comprises: i) at a first step within the iteration, identifying a greatest Time Improvement based on a doubling heuristic, wherein the iteratively identifying identifies, at the first step within the iteration, that the greatest Time Improvement is associated with a particular job of the iteration, ii) at a second step within the iteration, provisionally assigning to the particular job of the iteration, an additional first number of PUs, wherein the additional first number of PUs doubles a number of PUs provisionally assigned to the particular job of the iteration, and iii) stopping the iteratively identifying and provisionally assigning when a stopping condition is reached, wherein the stopping condition comprises the doubling heuristic being unable to identify a further provisional assignment to any job of the plurality of jobs.

In some embodiments of the method, the Time Improvement is of a form $$\text{Time Improvement} = \frac{1}{g_j}\left(\frac{Q_j}{f(g_j)} - \frac{Q_j}{f(2*g_j)}\right),$$

wherein $g_1$ is the number of PUs assigned to a first job of the plurality of jobs, $f(g_1)$ is a training speed function of the first job, $Q_1$ is an estimated number of epochs needed to complete the first job, and correspondingly $g_j$ is the number of PUs assigned to a $j^{th}$ job, $f(g_j)$ is a training speed function of the $j^{th}$ job, and $Q_j$ is an estimated number of epochs needed to complete the $j^{th}$ job, wherein $g_1$ PUs are configured to use a message passing protocol in a ring fashion, wherein an epoch corresponds to one set of training data, and wherein j is evaluated from 1, . . . , J within any iteration.

In some embodiments of the method, the first job is configured to implement a stochastic gradient descent (SGD) algorithm to update first neural network weights $W_1$.

In some embodiments of the method, the first job is configured to update the first neural network weights $W_1$ in part using a ring-based message passing algorithm.

In some embodiments of the method, the first job is configured to update the first neural network weights $W_1$ using an allreduce algorithm.

In some embodiments, the method, includes assigning each of provisionally assigned PUs to PUs of a cluster, thereby assigning a first number of PUs to the first job and a second number of PUs to a second job of the plurality of jobs; running, at a first time, the J jobs on the cluster, wherein the running comprises: performing the SGD algorithm for each job for at least a first training interval, and outputting weights for any job which has reached a second stopping condition.

In some embodiments of the method, the plurality of PUs comprises a plurality of graphics processing units (GPUs).

As a brief aside, a GPU may be, for example, a device provided by Nvidia Corporation of Santa Clara, Calif., U.S.A. An example Nvidia GPU has the product name GTX 1050, 1070, or 1080. An example base clock speed may be approximately 1200 MHz to 1700 MHz. An example number of cores per GPU may be approximately 600 to 4000. An example memory speed may be 7 Gbps to 11 Gbps ("Gbps" stands for Giga bits per second"). An example memory interface width may be approximately 128 bits to 352 bits. An example memory bandwidth may be approximately 112 GB/sec to 484 GB/sec ("GB/sec" stands for Giga bytes per second).

In some embodiments of the method, the plurality of PUs comprises a plurality of tensor processing units (TPUs).

As a brief aside, a TPU may be, for example, a device developed by Google of Mountain View, Calif., U.S.A. An example Google TPU may be called TPU v2 or TPU v3. For use with TPUs, an amount of high bandwidth memory (HBM) may be approximately 8 GiB to 16 GiB for each TPU core ("GiB" stands for Giga byte). Each TPU core may have two matrix processing units (MXU). An MXU is able to compute 16K (16*1024) multiply accumulate operations per cycle. A TPU pod may have 2048 total TPU cores and 32 TiB of total memory ("TiB" stands for Tera byte).

In some embodiments of the method, the plurality of PUs comprises a plurality of central processing units (C PUs).

An exemplary CPU may be an Intel Xeon processor produced by Intel of Santa Clara, Calif., U.S.A.

In some embodiments of the method, each of the first number of PUs and the second number of PUs is chosen from a first set, wherein the first set is a set of powers of two greater than or equal to 1: $\{1, 2^1, 2^2, 2^3, \ldots\}$.

In some embodiments, the method includes assigning each of provisionally assigned PUs to PUs of a cluster, thereby assigning a first number of PUs to the first job and a second number of PUs to a second job of the plurality of jobs; launching, at a first time, the J jobs on the cluster, wherein the launching comprises performing the SGD algorithm for each job for at least a first interval; stopping, after elapse of a predetermined interval measured from the first time, the SGD algorithm for each job; performing, based on data accumulated during the performing the SGD algorithm: i) a second initializing, ii) a second iteratively identifying and provisionally assigning to determine a second allocation from the plurality of PUs to the plurality of jobs, and re-starting the SGD algorithm for each job with the second allocation from the plurality of PUs.

In some embodiments of the method, predetermined interval is ten minutes.

In some embodiments of the method, predetermined interval is one hour.

Also provided is another method including jointly scheduling a first training of first weights $W_1$ and second training of second weights $W_2$ on a plurality of processing units (PUs), wherein the jointly scheduling is based on a doubling heuristic and a ring-based message passing algorithm, and wherein each job is configured to use a stochastic gradient descent (SGD) algorithm including an allreduce function with respect to the first weights $W_1$ and the second weights $W_2$, performing a first classification of first data using first weights $W_1$, wherein the first classification is a first image classification; and performing a second classification of second data using second weights $W_2$, wherein the second classification is a second image classification.

Also provided is yet another method including using an inner sequence of iterations within an outer sequence of iterations in a nested fashion, wherein a plurality of jobs includes J jobs, J is two or more, and a plurality of processing units (PUs) includes C PUs and C is two or more, the method comprising: during an outer iteration of the outer sequence of iterations: A) estimating a number of remaining epochs required to complete each job of the plurality of jobs; B) estimating a training speed function for each job of the plurality of jobs; C) provisionally assigning one PU to each job of the plurality of jobs; D) iteratively identifying and provisionally assigning to determine an allocation from the plurality of PUs to the plurality of jobs, in the nested fashion within the outer iteration, wherein the identifying and provisionally assigning, within an inner iteration of the inner sequence of iterations, comprises: i) at a first step within the inner iteration, identifying a greatest Time Improvement based on a doubling heuristic, wherein the iteratively identifying identifies, at the first step within the inner iteration, that the greatest Time Improvement is associated with a particular job of the inner iteration, ii) at a second step within the inner iteration, provisionally assigning to the particular job of the inner iteration, an additional first number of PUs, wherein the additional first number of PUs doubles a number of PUs provisionally assigned to the particular job of the inner iteration, and iii) stopping the iteratively identifying and provisionally assigning when a stopping condition is reached, wherein the stopping condition comprises the doubling heuristic being unable, within the inner iteration, to identify a further provisional assignment to any job of the plurality of jobs; E) assigning each of the provisionally assigned PUs from a conclusion of a most recent inner iteration to PUs of a cluster; F) launching or re-starting the J jobs on the cluster, wherein the launching comprises performing a stochastic gradient descent (SGD) algorithm for each job for at least a first interval; G) outputting weights for any job which has reached a second stopping condition; H) stopping, after elapse of a predetermined interval measured from the launching or restarting, the SGD algorithm for any job which has not reached the second stopping condition; and I) beginning a next outer iteration.

In some embodiments of the yet another method, the Time Improvement is of a form $$\text{Time Improvement} = \frac{1}{g_j}\left(\frac{Q_j}{f(g_j)} - \frac{Q_j}{f(2*g_j)}\right),$$

wherein $g_1$ is the number of PUs assigned to a first job, $f(g_1)$ is a training speed function of the first job, $Q_1$ is an estimated number of epochs needed to complete the first job, and correspondingly $g_j$ is the number of PUs assigned to a $j^{th}$ job, $f(g_j)$ is a training speed function of the $j^{th}$ job, and $Q_j$ is an estimated number of epochs needed to complete the $j^{th}$ job, wherein the $g_1$ PUs are configured to use a message passing protocol in a ring fashion, wherein an epoch corresponds to one set of training data, and wherein j is evaluated from 1, . . . , J within any inner iteration of the inner sequence of iterations.

Also provided is a device for scheduling a plurality of jobs to a plurality of processing units (PUs), wherein the plurality of jobs includes J jobs, J is two or more, and the plurality of PUs includes C PUs and C is two or more, the device comprising: one or more processors; and one or more memories, wherein the one or more memories store instructions, wherein execution of the instructions by the one or more processors causes the device to: A) initialize by provisionally assigning one PU to each job of the plurality of jobs, and B) iteratively identify and provisionally assign to determine an allocation from the plurality of PUs to the plurality of jobs, by: i) at a first step within the iteration, identifying a greatest Time Improvement based on a doubling heuristic, wherein the iteratively identifying identifies, at the first step within the iteration, that the greatest Time Improvement is associated with a particular job of the iteration, ii) at a second step within the iteration, provisionally assigning to the particular job of the iteration, an additional first number of PUs, wherein the additional first number of PUs doubles a number of PUs provisionally assigned to the particular job of the iteration, and iii) stopping the iteratively identifying and provisionally assigning when a stopping condition is reached, wherein the stopping condition comprises the doubling heuristic being unable to identify a further provisional assignment to any job of the plurality of jobs.

Also provided is an application specific integrated circuit (ASIC) for scheduling a plurality of jobs to a plurality of processing units (PUs), wherein the plurality of jobs includes J jobs, J is two or more, and the plurality of PUs includes C PUs and C is two or more, the ASIC configured to: initialize by provisionally assigning one PU to each job of the plurality of jobs; and iteratively identify and provisionally assign to determine an allocation from the plurality of PUs to the plurality of jobs, by: i) at a first step within the iteration, identifying a greatest Time Improvement based on a doubling heuristic, wherein the iteratively identifying identifies, at the first step within the iteration, that the greatest Time Improvement is associated with a particular job of the iteration, ii) at a second step within the iteration, provisionally assigning to the particular job of the iteration, an additional first number of PUs, wherein the additional first number of PUs doubles a number of PUs provisionally assigned to the particular job of the iteration, and iii) stopping the iteratively identifying and provisionally assigning when a stopping condition is reached, wherein the stopping condition comprises the doubling heuristic being unable to identify a further provisional assignment to any job of the plurality of jobs.

BRIEF DESCRIPTION OF THE DRAWINGS

The included drawings are for illustrative purposes to provide a basic understanding of embodiments provided herein.

FIG. 6A and FIG. 6B illustrate an exemplary logic flow, Logic 6, for determining a number of PUs to be assigned to each job with iterations nested within a stop/re-start iteration loopback, according to some embodiments.

DETAILED DESCRIPTION

Figure 1:
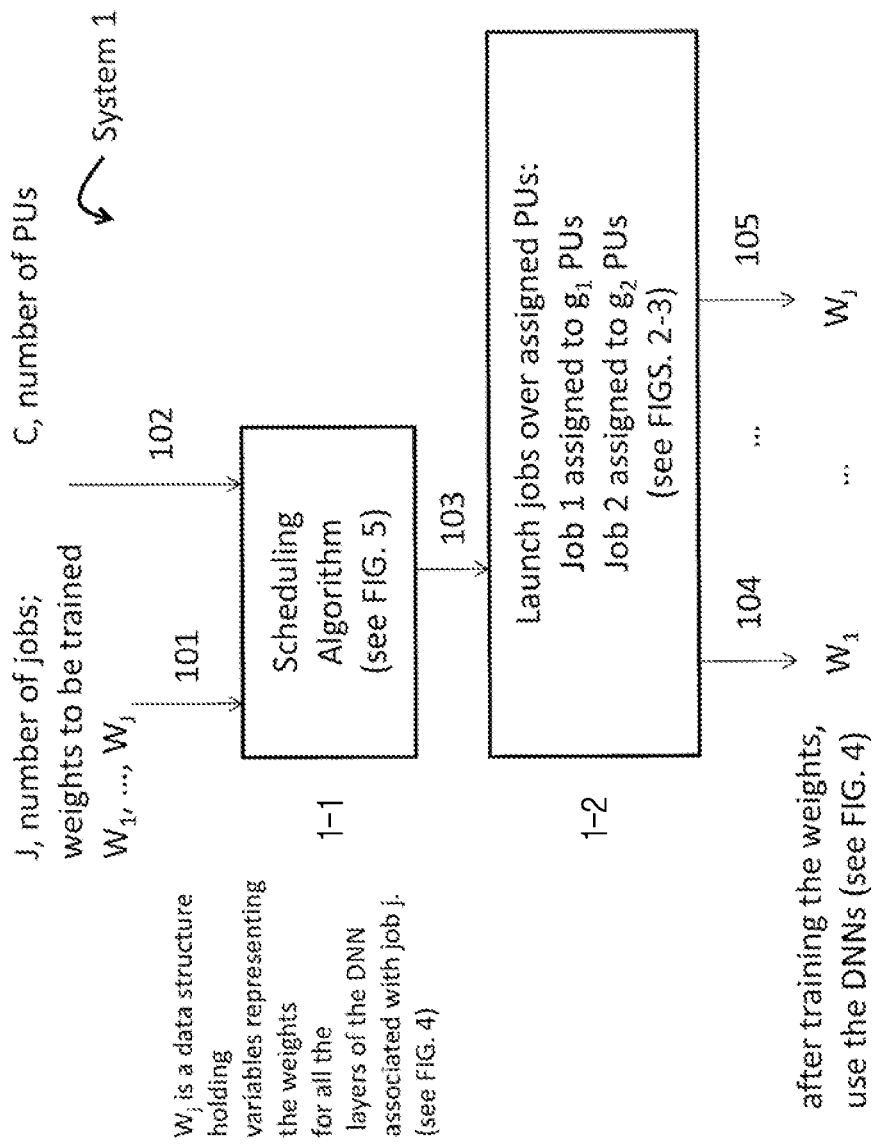
FIG. 1 illustrates a System 1 including an exemplary pool of J jobs provided as an input to a scheduling algorithm which produces assignments of processing units according to some embodiments.

One or more embodiments provided herein enable dynamic scheduling of neural network deep learning training jobs. For each job, a set of weights is trained. At a given time, J jobs need to be scheduled on to a group of C processing units (PUs). In some embodiments, a cluster includes the group of PUs.

In some embodiments, a PU is a graphics processing unit (GPU), tensor processing unit (TPU) or central processing unit (CPU).

Embodiments provided herein describe scheduling algorithms for scheduling the J jobs onto the C PUs. The provided scheduling algorithms allow efficient use of the C PUs. The scheduling algorithms provided herein consider a training speed function, $f$, for each job. Also considered is a number of training data sets to be processed in the training to reach a converged state of the weights being trained. A duration of processing of one training data set is referred to as an epoch.

The scheduling algorithms consider the nature of processing in training a deep neural network. This processing is typically based on a stochastic gradient descent algorithm (SGD). When a job is run, the weights are trained with SGD. Message passing between PUs as part of the training is done using a ring-based message passing algorithm.

Efficient use of PUs for the SGD results in a scheduling characteristic of assigning the number of PUs for the $j^{th}$ job, $g_j$, from the set $\{1, 2^1, 2^2, \ldots 2^M\}$, where $2^M$ is less than or equal to C. That is, the number of PUs assigned to any job is a power of two. In some instances this application refers to the power of 2 as z. For example, the number of PUs assigned to job j may be referred to as $2^{z_j}$.

The number of PUs to assign to each job is found by following an iterative algorithm. Overall, the algorithm uses a heuristic to decide which job will be provided with a doubling of the number of processors assigned. This is in contrast to assigning a fixed number of PUs to each job. The iterative doubling based on a heuristic is also in contrast to a round robin approach in which each job is given an additional PU until the pool of C PUs is exhausted.

After separate processors have separately estimated a weight data structure W for a given job while running the SGD algorithm, the various estimates are collected together before the next training sets are applied. In some embodiments, this bringing together the weights is called "Allreduce." A ring structure of message passing is particularly effective for Allreduce.

A discussion of a ring structure for message passing is discussed in "Accurate, Large Minibatch STGD: Training ImageNet in 1 Hour," P. Goyal, P. Dollar, R. Girshick and P. Noordhuis, Cornell Archive index arXiv:1706.02677v2 (hereinafter "Goyal Paper"). The Goyal Paper also discusses the SGD algorithm in detail.

A discussion of allreduce is provided in R. Thakur, R. Rabenseifner, and W. Gropp, "Optimization of Collective Communication Operations in MPICH," The International Journal of High Performance Computing Applications (IJHPCA), 2005 (hereinafter "Thakur Paper").

The suitability of the doubling strategy for PU assignment allows the heuristic to explore scheduling assignments which might not be reachable if PUs are assigned one at a time. For example, a job with a provisional assignment of $g_j$ PUs might not show significant time improvement at $g_{j+1}$ PUs assigned. However, the job may be the best candidate for an allocation of additional PUs when $2*g_j$ PUs are provisionally assigned in total. Below, the time improvement is normalized per provisionally assigned PU.

The heuristic identifies which job will benefit in terms of time improvement per PU the most. Viewing time as an expensive commodity, the heuristic has some similarity to identifying an allocation of PUs which brings the greatest reduction in cost per PU assigned. After a job is identified for a doubling of the number of PUs, the state of the algorithm includes representation of the identified job as having an updated number of provisionally assigned PUs. The process is then repeated based on the new state (and reduced PU pool) to identify another job for doubling of provisionally assigned PUs and to update the state of the scheduling algorithm. The process is iterated until no job can have the number of PUs doubled without overreaching the pool of C PUs.

There is a possibility that the number of the sum of provisionally assigned PUs is less than C by a number $N_{remaining}$, and that no job could accept a doubling of its provisionally assigned PUs without requiring more than the $N_{remaining}$ PUs. In such a case, $N_{remaining}$ PUs are not assigned at this job scheduling event. This is in contrast to round-robin scheduling, in which case $N_{remaining}=0$ after the provisional assignments are completed.

Specific points of scheduling algorithms provided herein will now be discussed.

Each job corresponds to a deep neural network (DNN). The DNN for the $j^{th}$ job has $N_j$ layers. Each layer has a matrix of weights. The weights for the $j^{th}$ job may be expressed as a data structure $W_j$. $W_j$ may be expressed as a sequence of two dimensional matrices, $w_{j,i}$, where i refers to the $i^{th}$ layer: $W_j=\{w_{1,1}, \ldots w_{1,i}, \ldots w_{1,Nj}\}$. An example of how weights are found in a DNN using SGD can be found in "Deep Residual Learning for Image Recognition," K. He, X. Zhang, S. Ren and J. Sun, Cornell Archive index arXiv: 1512.03385v1(hereinafter "Resnet Paper"). The Resnet Paper refers to a DNN called "Resnet." The "Res" refers to modeling a residual. Resnet has been found to be a very good structure for training DNNs.

The algorithm first obtains, or receives as input, the training speed function $f$ for the $j^{th}$ job as a function of the number of PUs provisionally assigned for the $j^{th}$ job. That is, $f_j(g_i)$ for $j=1, \ldots, J$ and i a power of two from the set $\{1, 2^1, 2^2, \ldots 2^M\}$ where 2M is less than or equal to C. In order to simplify notation, the number of processors provisionally assigned to the $j^{th}$ job will be denoted $g_j$.

The algorithm initially assigns 1 PU to each job.

A time improvement per PU is then estimated for doubling the provisional assignment $g_j$ by adding another $g_j$ PUs for the jth job. Thus, $g_{j,new}$ is replaced with a new number of assigned processors $g_{j,new}=2*g_{j,old}$ which also may be written as $g_{j,new}=g_{j,old}+g_{j,old}$.

Generally, a time to travel a distance may be written as the distance divided by the speed of travel, t=x/v. Similarly, a time to complete training may be written as the number of epochs needed divided by the training speed function. A time for completion with the provisional assignment may thus be written as $T_{j,old}=Q_j/f(g_{j,old})$. A time after doubling may be written as $T_{j,new}=Q_j/f(2*g_{j,old})$.

In general, a time improvement may be expressed as a time under an old configuration minus the time required under the new configuration. In embodiments provided herein, a time improvement, averaged over the number PUs currently provisionally assigned, $g_{j,old}$, may thus be written as Time Improvement per PU is equal to $(1/g_{j,old})*(T_{j,old}-T_{j,new})$, or, in Equation (1A):

$$\text{Time Improvement} = \frac{1}{g_j}\left(\frac{Q_j}{f(g_j)} - \frac{Q_j}{f(2*g_j)}\right), \quad (1A)$$

in which the notation "old" has been suppressed as it is understood to appear with each $g_j$.

In some embodiments, the scheduling algorithm is iteratively run, provisionally assigned PUs become assigned PUs, and updates to $W_j$ for each j are begun using SGD by the PUs running on a cluster. Then, after a predetermined time, the PUs are stopped. The scheduling algorithm is then iteratively run for a second time, thereby adjusting $g_j$ is for each job j. If an additional job has entered the job pool, the additional job is also allocated resources from the C PUs. In such a case J has advanced to J+1 or it may be written J'=J+1.

An update of the SGD may be formed as follows, for a given layer and a given job. Equation (1B) is:

$$w_{t+1} = W_t - \mu \Sigma_t \nabla \text{loss}(w, w_t) \quad (1B)$$

where μ is a step size, ∇ is a gradient, and loss is a loss function.

Further details of SGD may be found in the Goyal Paper. For example, SGD with momentum is described at equation 9 of the Goyal Paper.

Where m is a step size. Because algorithms provided herein are dynamic, scheduling may be adjusted in real time after stopping the cluster and/or when a new job enters the job pool. Also, a job k may complete (the weights $W_k$ have converged) and the job k will be removed from the job pool. After the job k is removed, the scheduling algorithm is run again.

After completion of the job k, the scheduling algorithm start from the beginning with assigning 1 PU to each job, other than job k.

As a brief aside, in some embodiments, after 1 PU is assigned to each job, a newly assigned job is immediately provided with a second PU. In this embodiment, when entering logic item 5-5 of FIG. 5 (see below) for the first time after an arrival of a new job m (these events following arrival of a new job may be called a local iteration), new job m is provided $g_m=2$. Logic flows to item 5-6 and then by loopback 501 to item 5-5 for the second entry of item 5-5 in this local iteration. At the second entry of FIG. 5 item 5-5 of the local iteration, the algorithm proceeds as usual with using the doubling heuristic (see equation 9 below expressing Time Improvement as a function of Q and $f$) to discover which job enjoys the greatest Time Improvement with a doubling of PUs.

Referring now to Time Improvement in general, embodiments provided herein model performance of machine learning jobs by a two-step process: first, the number of epochs for completion is modeled through online fitting, and second, time per epoch is modelled for given resource configurations. Below, Q is the estimated number of epochs to convergence. Below, $f(g)$ is a training speed function indicating the velocity in epochs per second. These two estimates, Q and $f$, allow the runtime of a job to be estimated.

Let k be batch step and L be loss and $b_0$, $b_1$, and $b_2$ the parameters to be solved for. Since SGD converges at O(1/k) ("order of 1/k") the following equation is fit using NNLS with $b_0>0$ in Equation (1C):

$$L = 1/(b_0*k + b_1) + b_2 \quad (1C)$$

Below, a resource-to-speed model is provided that accounts for all the different algorithms used in ring architectures for allreduce.

The model is a combination of: forward propagation time, all reduce time, backward propagation time and communication overhead. Suppose there are w workers on the job. The forward propagation time is modeled as the size of a training set multiplied by the time to process an example: $m*T_{forward}$. $T_{back}$ can be used to represent the back propagation of a single example and thus model backpropagation of a training set as $m*T_{back}$. Data parallelism in TensorFlow and Horovod distribute this computation across the workers and use gradient exchange to update. Allreduce is modeled in accordance with each algorithm, where A is the latency per message, B is the transfer time per byte, G is the computation cost per vector byte, m is the size of a training set and n is the size of the model $T_{ring}$ is for ring architectures with the ring algorithm, $T_{dh}$ is for ring architectures with doubling-halving and $T_{bb}$ is for ring architectures with binary blocks. The coefficients of A, B and G are based on the underlying collective communications primitives. See the Horovod Paper. Below, Equations 2-5 are listed (note that the number of PUs g is written as a number of workers, w).

$$T_{ring} = m*(T_{forward} + T_{back}) + (w-1)*4*\alpha + (w-1)*(n/w)$$
$$*4*\beta + (w-1)*(n/w)*2*\gamma \quad (2)$$

$$T_{dh} = m*(T_{forward} + T_{back}) + 4*\log(w)*\alpha + 4*n*\beta + 5/2*n*\gamma \quad (3)$$

$$T_{bb} = m*(T_{forward} + T_{back}) + (5 + 4*\lceil \log(w) \rceil)*\alpha + 7*n*\beta + 3*n*\gamma \quad (4)$$

$$f(w) = (\theta_0*(m/w) + \theta_1*(w-1) + \theta_2*(w-1)*(n/w) + \theta_3)^{-1} \quad (5)$$

$f(g)$, written as $f(w)$ in Equations 2-5, is a resource model where θ's are positive coefficients to be learned for each job. It's beneficial to introduce $\theta_3$ to collect constant terms. The same $f$ can be used to model all three T's but the behaviors of the coefficients will be different. This different behavior has consequences for the heuristic used to schedule. In all cases, an NNLS model can be fit for each value of the number of assigned PUs, g (written as w in Equations 2-5). To learn the values of O's, data points of the form $(g, f(g))$ are collected.

From the above original and novel analysis, it is found that $T_{ring}$ indicates the ring architecture is best for application of the SGD algorithm.

In a typical DL cluster, jobs arrive in an online manner. This application models a periodic allocation of resources to active jobs by adjusting the number and placement of workers for each job in the shared DL cluster. Each worker is a processing unit (PU). Before scheduling a job, the scheduler trains its model on a small set of training data for several steps with possible values of w (precompute) or it must execute a data gathering strategy so that it can subsequently schedule efficiently (explore).

In each scheduling interval, let $Q_j$ be the remaining epochs to achieve model convergence as predicted above. $f(g_i)$ is the training speed for job j with $g_i$ workers in epochs per second as predicted above. Let C be the GPU capacity and let $t_j$ be the time taken for job j. This application models the scheduling problem as:

$$\text{Minimize:} \Sigma_{j \in J} t_j \quad (6)$$

Subject to:

$$t_j = \frac{Q_j}{f((g_j))} \quad (7)$$

$$\forall j \in J$$

$$\sum_{j \in J} g_j \leq C \quad (8)$$

where $g_j$ is a positive integer.

The doubling heuristic of embodiments provided herein works by assigning 1 worker to every job, then assigning additional workers by doubling based on the average marginal gain Equation (1A) is repeated here as Equation (9):

$$\text{Time Improvement} = \frac{1}{g_j} \left( \frac{Q_j}{f(g_j)} - \frac{Q_j}{f(2*g_j)} \right), \quad (9)$$

The assignments, $g_j$, occur by picking the maximum of these time improvements at each step and assigning an additional $g_j$ workers to the task that maximizes per PU gain. This doubling heuristic is important as some increases in PUs have worse algorithmic performance leading to the other heuristics getting stuck in local optima. For example, going from 8 to 9 PUs will have worse per PU performance than going from 8 to 16 PUs in some scenarios. This means that even though going to 16 PUs could be desirable it may not be reachable without the heuristic change because the poor score for going from 8 to 9 PUs would block exploring 16 PUs. The changes are also useful for practical aspects as limiting possible assignments enables more precomputation. Simulating every run to an adequate level of accuracy requires tens of seconds per configuration and limiting the available configurations dramatically improves simulation time.

Task placement is the allocation of jobs to specific hardware once the allocation sizes have been solved by the scheduler. Task placement is much simpler for ring architectures as there are no parameter servers. It is still important to allocate as few total nodes as possible for the same number of PUs. The task placement portion of scheduling can be solved straightforwardly by standard algorithms.

Further description of exemplary embodiments will now be given with respect to the figures.

FIG. 1 illustrates a System 1. At scheduling algorithm 1-1, J jobs are associated with data structures $W_1, \ldots, W_J$, as mentioned above. The data structures $W_j$ are weights to be trained for a deep neural network. At the time of performing scheduling algorithm 1-1, the values of the weights are unknown. It is the object of the scheduling algorithm shown at 1-1 to assign a number of PUs $g_j$ to each job j. A number of PUs, C, is input to 1-1 as an upper limit on the number of PUs available in the cluster shown at 1-2. After scheduling each job on a number of PUs of the cluster 1-2. The jobs will then be launched on the cluster 1-2. As an output from 1-2, the converged weights will be obtained.

The scheduling algorithm 1-1 is performed in a number of different ways, in some embodiments. In some embodiments, the scheduling algorithm 1-1 is performed by one or more processors executing instructions from one or more processors. In some embodiments, the instructions are stored on a non-transitory computer readable medium. In some embodiments, the scheduling algorithm 1-1 is performed by an application specific integrated circuit (ASIC). In some embodiments, the scheduling algorithm 1-1 is performed by a combination of hardware and software.

Figure 2:
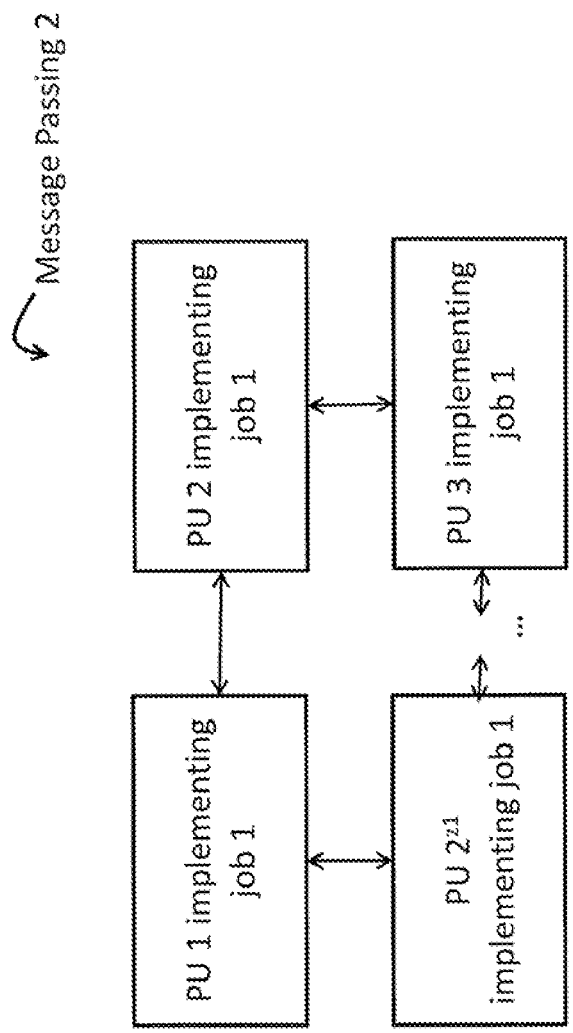
FIG. 2 illustrates Message Passing 2 including an exemplary arrangement of a number of PUs communicating in performing a first job of the J jobs of FIG. 1, according to some embodiments.

FIG. 2 illustrates Message Passing 2. In particular, FIG. 2 illustrates a ring architecture message passing algorithm between the PUs assigned to job 1, as an example. The concept is the same for other jobs. The message passing algorithm is a ring method in which the data from each PU is sent around a virtual ring of PUs. As an example, in a first step, each PU i sends its estimate of the W data structure to PU i+1 and receives an estimate of W from PU i−1 (with wrap-around). This sharing of the estimates of W can be implemented efficiently by a process called allreduce mentioned above and described in the Thakur Paper and the Rabenseifner Paper.

Figure 3:
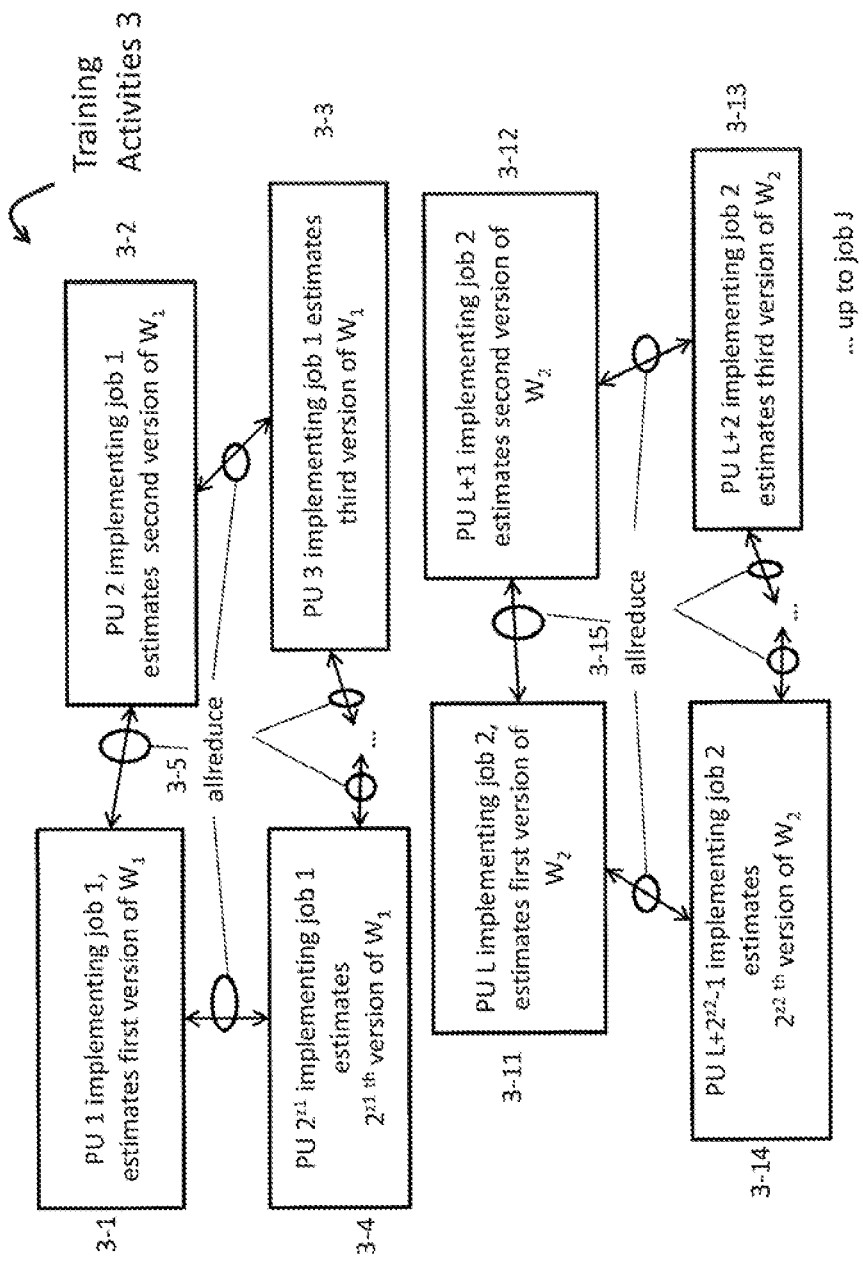
FIG. 3 illustrates Training Activities 3 including exemplary execution of two of the J jobs, their estimates of weights, and the function allreduce acting on the estimates of weights, according to some embodiments.

FIG. 3 illustrates the ring architecture for two jobs executing Training Activities 3 on the cluster 1-2. Allreduce is shown schematically with respect to the inter-PU communication when updating the weight estimates. The PUs shown as 3-1, 3-2, 3-3 and 3-4 (some assigned PUs may be shown by the " . . . ") are estimating the weights $W_1$.

In some embodiments, the PU shown as 3-1 estimates a first version of $W_1$, the PU shown as 3-2 estimates a second version of $W_1$, the PU shown as 3-3 estimates a third version of $W_1$, and the PU shown as 3-4 estimates a $2^{z_1}$ version of $W_1$, (some versions of $W_1$ estimated are indicated by the " . . . "). The allreduce function updates these estimates to harmonize them before the next set of training data is processed with the SGD algorithm by PUs shown as 3-1, 3-2, 3-3 and 3-4.

The lower portion of FIG. 3 indicates that a similar process, with in general a different number of PUs, that is $2^{z_2}$ PUs, are working on finding the weights $W_2$. The invocation of allreduce for job 2 is in general at a different time than the invocation of allreduce for job 1, since the dimensionality of W1 and W2 are independent (unrelated) and the number of PUs assigned may be different ($g_2$ is not the same as $g_1$, in general).

The lower right portion of FIG. 3 indicates " . . . up to job J" indicating that similar processes for training the weights for $W_3, \ldots, W_J$ are occurring on PUs of the cluster 1-2.

Figure 4:
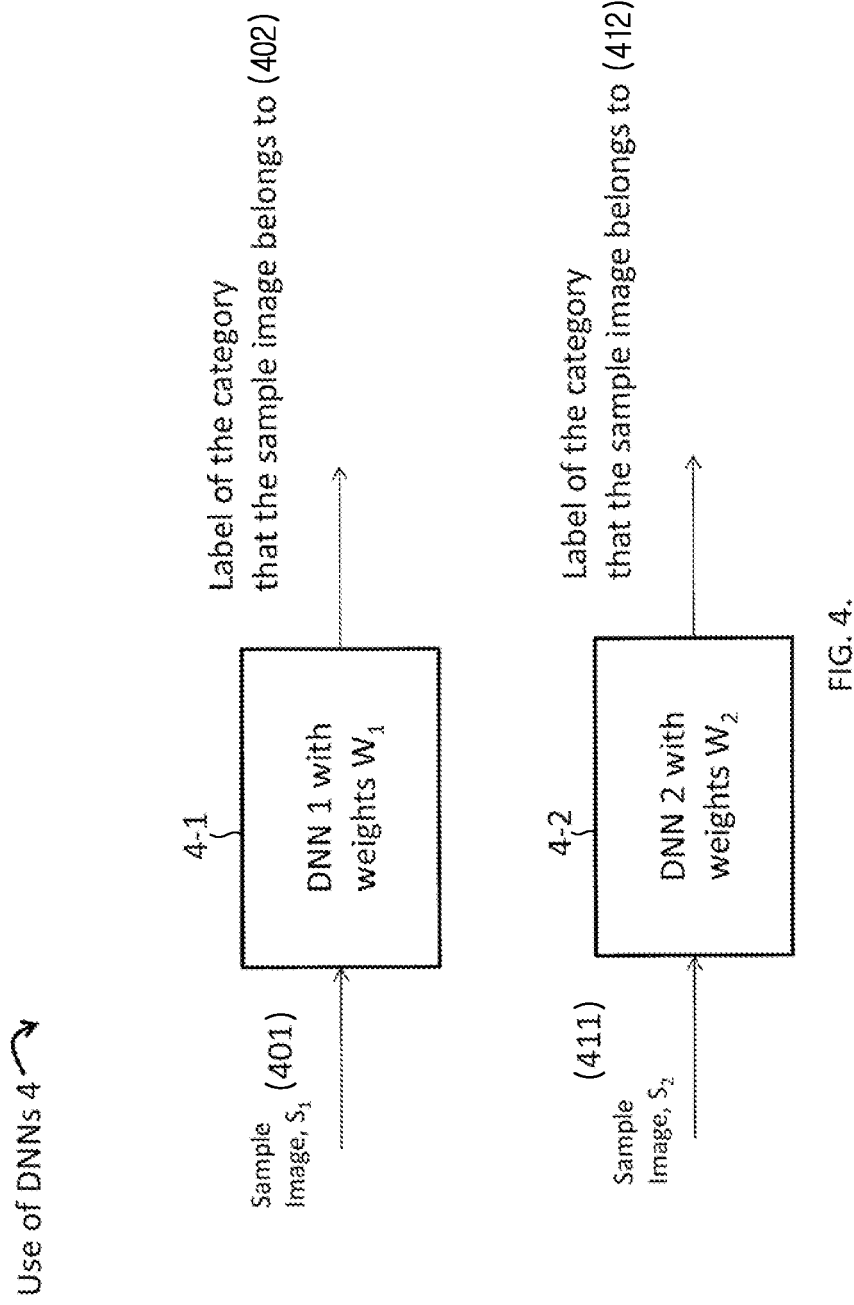
FIG. 4 illustrates use of DNN 4 including exemplary use of two of the weight datasets in performing classification of images, according to some embodiments.

FIG. 4 illustrates Use of DNNs 4. FIG. 4 is an exemplary use of the trained weights for an example of J=2. 4-1 indicates a DNN with weights $W_1$ and 4-2 indicates a DNN with weights $W_2$.

As an example of the use of the weights, a sample image (s1, s2) from a benchmark data set such as CIFAR-10 is supplied as an input 401 to DNN (4-1). The DNN indicated by 4-1 then processes the image using the weights Wi and produces a label of a category to which the image belongs (402). The output label is indicated as 402.

Similarly, a sample image from another benchmark data set is provided as an input 411 to the DNN indicated by DNN (4-2) with weights W2. Input 411 is processed by weights W2 and produces a label of a category to which the image belongs(412) as an output.

Figure 5A:
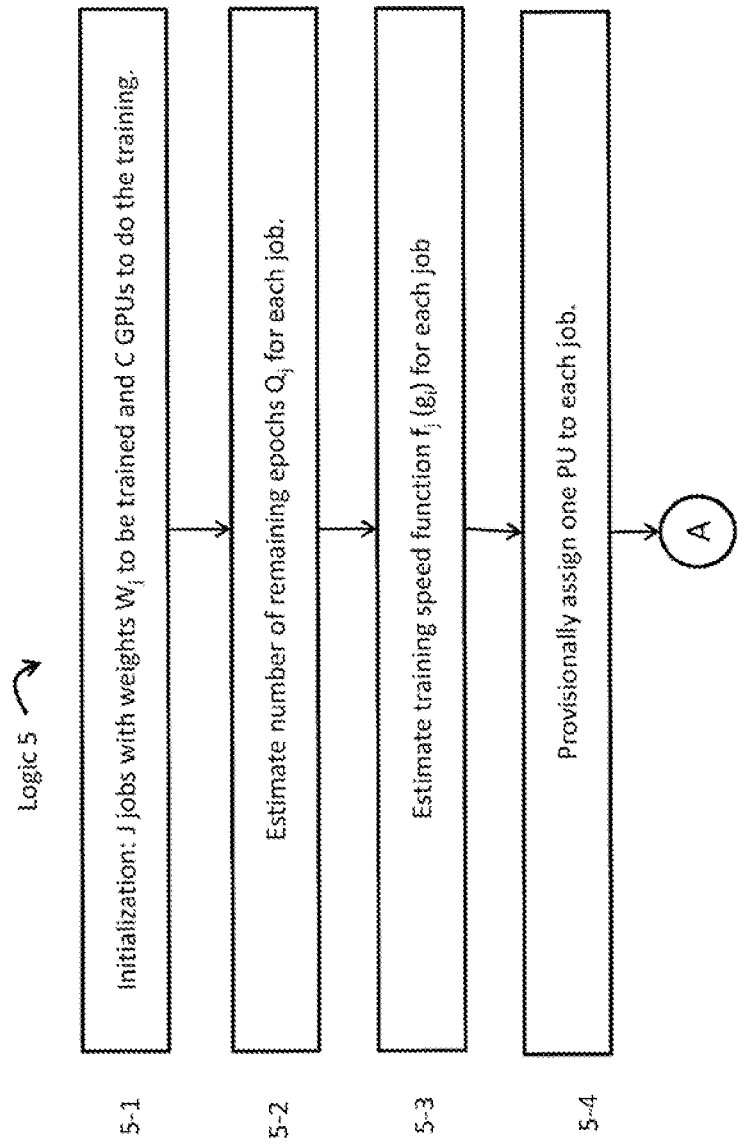
FIG. 5A and FIG. 5B illustrate an exemplary logic flow, Logic 5, for determining a number of PUs to be assigned to each job, according to some embodiments.
Figure 5B:
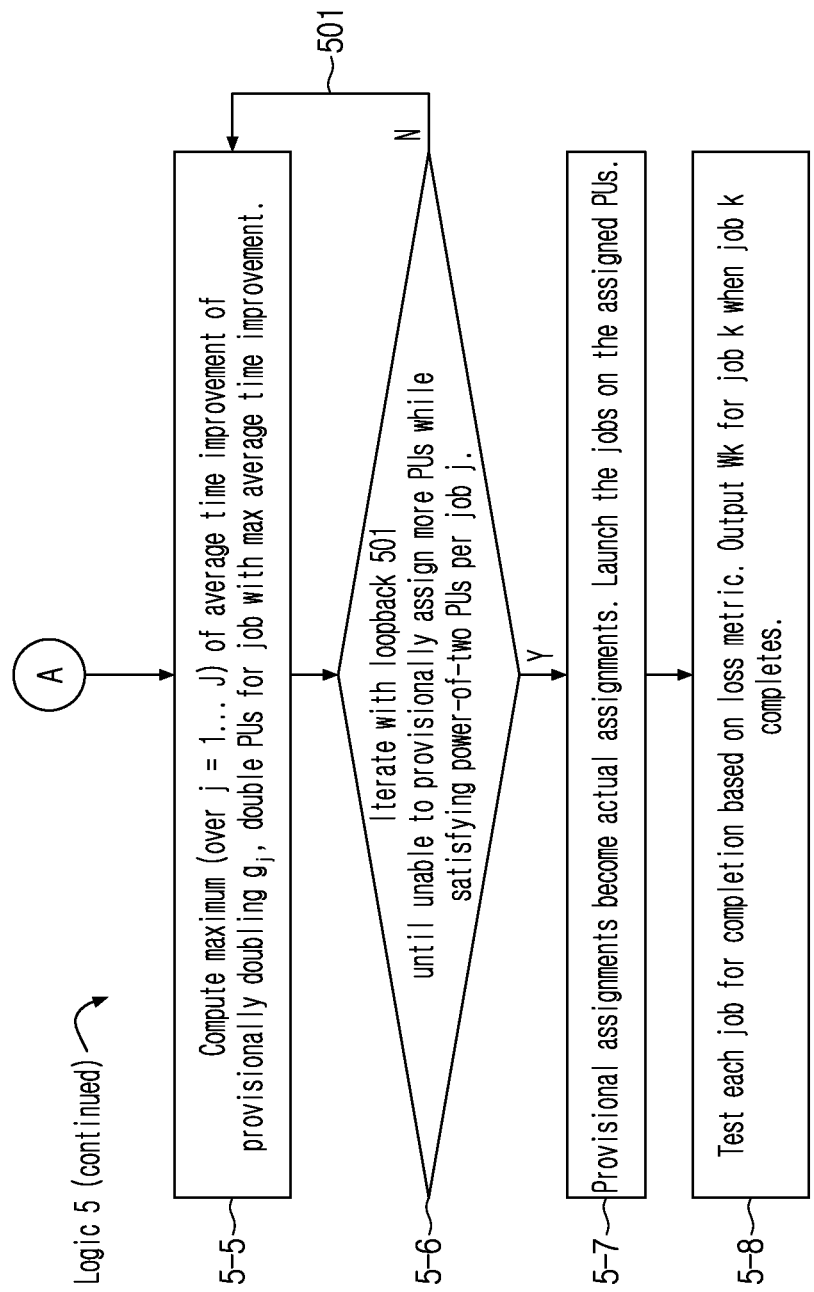

FIG. 5A and FIG. 5B illustrate an exemplary logic flow, Logic 5, for an embodiment of the scheduling algorithm provided herein.

At 5-1, weights $W_j$ for J jobs are initialized and the scheduling algorithm is informed that C PUs are available.

At 5-2, the number of remaining epochs needed for each job are estimated. For job j, the estimated number of remaining epochs is indicated as $Q_j$.

At 5-3 the training speed function $f_j(g_i)$ is estimated for each job j as a function of number of PUs assigned $g_i$.

At 5-4, each job is provisionally assigned one PU.

At 5-5, a number of PUs is doubled for a job and an average time improvement is estimated. This is done for each job separately. The job for which the time improvement is largest is awarded a doubling of its assigned number of PUs.

At 5-6, a stopping condition is checked to see if there remain any PUs which can be assigned. If yes, then the logic loops back as shown by 501 to step 5-5.

When no more PUs can be assigned, the logic flows to 5-7. At 5-7, provisionally assigned PUs become assigned PUs. The J jobs are launched on the cluster 1-2, each job with the number of PUs $g_j$ determined by the scheduling algorithm.

At 5-8, each job is tested for completion. For a job k that has completed, the weights $W_k$ are output, in some embodiments. Alternatively, all weights may be output when the last-completing job has completed. The index k is simply a place-holder variable and has no special significance. In general, the jobs may finish at different times.

The test for completion occurs based on the convergence criterion for the SGD algorithm. In some embodiments, the test for completion is based on the loss metric. For example, when the loss metric indicates that the weights $W_k$ are successfully predicting the training data within a certain accuracy, such as 5%, 1% or 0.1%, job k is deemed completed.

After completion of the jobs, the weights $W_1, \ldots, W_J$ are obtained as outputs of cluster 1-2 as shown in FIG. 1 and ready for use in operational DNNs, for example, as shown in FIG. 4.

Figure 6A:
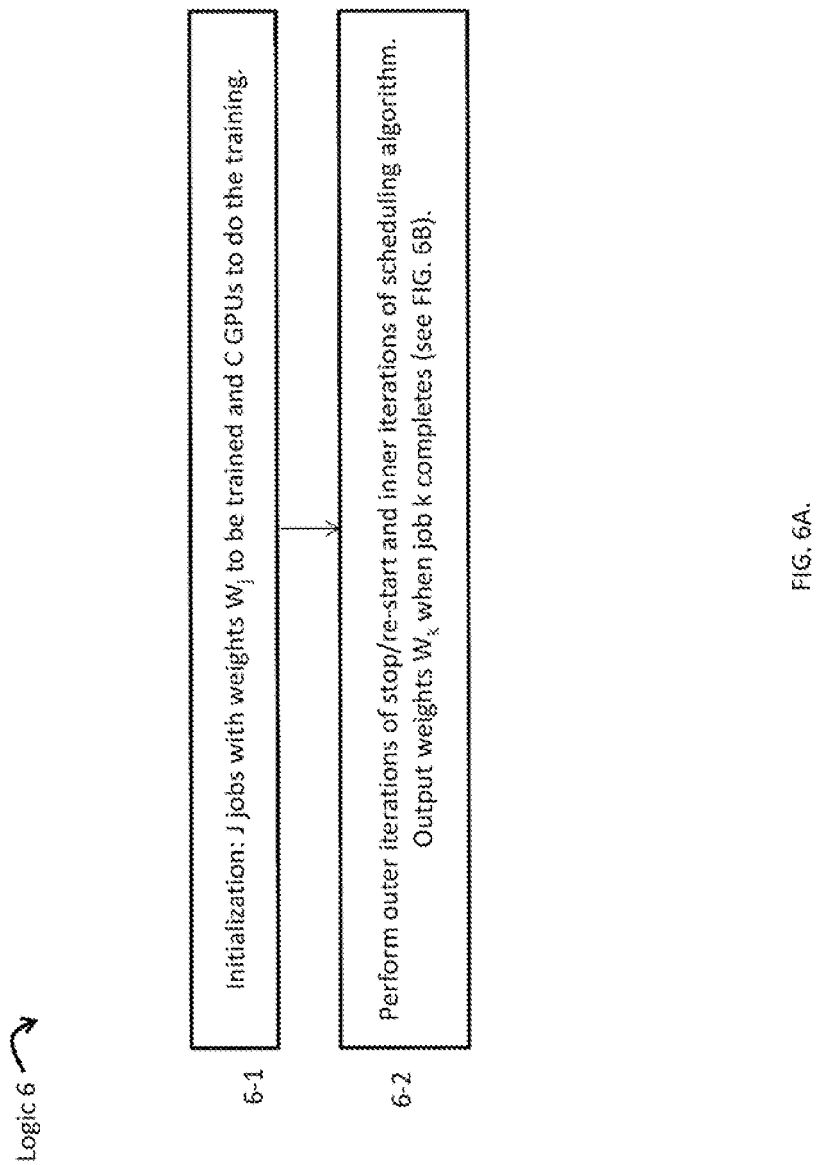

FIGS. 6A-6B provide an exemplary logic flow, Logic 6, illustrating a stop/re-start embodiment.

At 6-1, weights $W_j$ for J jobs are initialized and the scheduling algorithm is informed that C PUs are available. This is similar to 5-1 of FIG. 5.

At 6-2, outer iterations of stop/re-start are performed. For each outer iteration, two or more inner iterations of the scheduling algorithm 1-1 are performed. That is 6-2 represents running/stop/re-starting and scheduling PU assignments in a nested loop fashion. The details of 6-2 are shown in FIG. 6B.

Turning to FIG. 6B, at 6-21, the number of remaining epochs needed for each job are estimated. For job j, the estimated number of remaining epochs is indicated as $Q_j$. This is similar to 5-2 of FIG. 5. However, 6-21 also serves a re-entry point when a stop has occurred at 6-26.

At 6-22 the training speed function $f_j(g_i)$ is estimated for each job j as a function of number of PUs assigned $g_i$.

At 6-23, each job is provisionally assigned one PU.

At 6-24, a number of PUs is doubled for a job and an average time improvement is estimated. This is done for each job separately. The job for which the time improvement is largest is awarded a doubling of its assigned number of PUs.

At 6-25, loopback 601 to 6-24 is followed to perform another inner iteration occurring as part of the scheduling algorithm 1-1. Loopback 601 is not taken when the scheduling algorithm 1-1 is unable to provisionally assign more PUs while satisfying the power-of-two PUs per job constraint.

At 6-26, provisional assignments become actual assignments (similar to 5-7).

Also at 6-26, the jobs are launched or re-started. That is, the first time that 6-26 is reached, the jobs are started for the first time. If 6-26 is reached a second time, third time, etc, the jobs are re-started. When the jobs are launched or re-started, the jobs are run on the cluster 1-2, each job with the number of PUs $g_j$ determined by the scheduling algorithm performed in 6-24 and 6-25. The jobs are stopped after an elapse of time $T_{stop\_interval}$. Exemplary values of $T_{stop\_interval}$ are 10 minutes and 1 hour.

After completion of the jobs, the weights $W_1, \ldots, W_J$ are obtained as outputs of 1-2 as shown in FIG. 1 and ready for use in operational DNNs as shown, for example, in FIG. 4. An example of outputting weights Wk of job k is shown, similar to 5-8.

In item 6-7, when job k completes, $W_k$ is output, in some embodiments.

EXPERIMENTAL RESULTS

The ResNet model for image classification as a primary deep learning model and task is used herein. ResNet has achieved widespread adoption across a variety of tasks and datasets, and is often used as a feature extractor for downstream tasks. The number of layers is 110. For training time considerations, the experiments are run on the CIFAR-10 dataset, which contains more than an order of magnitude fewer images than ImageNet.

The experimental hardware consists of a single node having 8 Tesla K40m GPUs with an active memory of—11.25 GB each, 40 Intel Xeon E5-2670 cores with a clock rate of 2.50 GHz and an Infiniband interconnect with 100 Gbit/sec (4× EDR) throughput. The number of cores that will be used is equal to the number of GPUs being used for a given training job.

TABLE 1

Profiling results on ResNet-110 for a minibatch size of 128 images per GPU.

| # GPUs | $T_{forward}$ (ms) | $T_{back}$ (ms) | $T_{total}$ (ms) | images/sec |
|---|---|---|---|---|
| 1 | 108.0 | 236.5 | 402.5 | 318.0 |
| 2 | 110.2 | 274.6 | 427.2 | 576.2 |
| 4 | 107.1 | 290.1 | 444.3 | 1152.4 |
| 8 | 106.0 | 307.4 | 470.2 | 2177.8 |

TABLE 2

Training statistics for different stop and restart configurations

| # GPU $s_{init}$ | steps$_{stop}$ | # GPU $s_{new}$ | steps$_{tot}$ | epochs | Tint (min) | # GPU $s_{init}$ |
|---|---|---|---|---|---|---|
| 1 | N/A | N/A | 62.5 k | 160 | 368 | 1 |
| 2 | N/A | N/A | 33.2 k | 170 | 232 | 2 |
| 4 | N/A | N/A | 15.6 k | 160 | 126 | 4 |
| 8 | N/A | N/A | 8.3 k | 170 | 84 | 8 |
| 4 | 5 k | 8 | 10.9 k | 171 | 104 | 4 |

Embodiments leverage the official TensorFlow implementation of ResNee, and use Tensorflow v1.8.0, CUDA v9.0, cuDNN v7.0.5, OpenMPI v2.1.3, NCCL v2.1.15 and Horovod v0.13.11.

As baselines, the Resnet training on 4 GPUs and 8 GPUs is run without any resizing. The training job is then rerun initially with 4 GPUs, checkpoint and stop at different steps during training and restart the training job with 8 GPUs. While resizing the configuration, the number of examples per GPU is kept constant at 128. So the global batch size increases with the increase in the number of GPUs. The initial learning rates are adjusted according to the suggestion given in:

$$Lr_{new} = (\#PUs_{new}/\#PUs_{last}) * Lr_{last} \qquad (10)$$

Learning decay is ensured to occur at the appropriate number of epochs with the change in the global batch sizes. The suggested initial learning rate for 1 GPU with batch size of 128 is 0.1. The initial learning rates are taken for 4 GPUs as 0.4 and 8 GPUs as 0.8. The learning rate is divided by 10 at epochs 100 and 150.

Below, it shown that checkpointing is time efficient. That is to say start and stop time is negligible and convergence of jobs from checkpointing and resuming with additional hardware is rapidly accelerated. Some experiments are run with a Horovod job that is initially scheduled on 4 GPUs and restores from checkpoint to run on 8 GPUs.

The training runtime of ResNet-110 for the C1FAR-10 dataset are profiled. Table 1 confirms an expectation that there should be no statistically significant difference between forward propagation times across various numbers of GPUs. Analysis reveals that backward propagation and all reduce operations are performed concurrently, such that gradient exchange occurs concurrently with the computations of other gradients. Overall, the system's scaling efficiency from 4 to 8 GPUs is 94.5%. As such, the rescaling algorithm will not suffer significant performance drops from increased number of GPUs for a given job, and associated gains from better resource utilization will remain intact.

GPU resources are reallocated at different points of training. Table 2 shows the different training configurations. The first 3 training jobs are baselines with constant number of resources (GPUs) for the entire training job. The total number of steps and the time it takes to converge with different number of GPUs is observed. Experiments are then shown with checkpoint, stop, reallocate resources and restart. As shown in the last two experiments in Table 2, training is started with 4 GPUs with training set size of 128/GPU. The training is stopped at 5 k steps (after 51 epochs) and 10 k steps (after 102 epochs) marks for experiments 4 and 5 respectively and checkpoint the models.
ihttps://github.com/tensorflow/modelskree/master/officialfresnet

TABLE 3

Average job completion times (in hours) for various arrival times and scheduling strategies

| Algorithm and Contention | Extreme | Moderate | None |
| --- | --- | --- | --- |
| Exploratory | 20.42 | 2.92 | 1.47 |
| Precompute | 7.63 | 2.63 | 1.40 |
| Eight | 22.76 | 6.20 | 1.40 |
| Four | 12.90 | 3.50 | 2.21 |
| Two | 11.49 | 4.58 | 3.78 |
| One | 10.10 | 6.32 | 6.37 |

Training is then restarted with 8 GPUs for the training job and continue training from the last checkpoint saved. When the training is restarted, the learning rate is also adjusted by a factor of 2 using equation 10. Embodiments save close to 50 min 32%) when embodiments restart the job with 8 GPUs after pausing training at 51 epochs and close to 36 min 23%) when embodiments pause and restart after 102 epochs. The checkpoint, stop, reallocation, restart times average 10 seconds, which is fairly minor in terms of the performance gains by reallocating more resources to the training job.

Consequently, the rescaling algorithm will improve the runtime of jobs by rescaling to take advantage of newly available resources.

Using data from the experimental runs the inventors of this application developed a simulation of a scheduler which allocates PUs to jobs according to a scheduling strategy and predicts the convergence of those runs based on data from previously completed runs. Provided are six strategies: A precompute version of the scheduling strategy which assumes minimum data to simulate has been generated by scheduling time, an exploratory version of the strategy which gives a new job 8 GPUs for the first ten minutes to run for 2.5 minutes at each of 1,2,4 and 8 GPUs, and four fixed strategies where each job requests 1, 2, 4 or 8 GPUs respectively. In the no contention case, each job is able to get its maximum permitted GPU's under the strategy it's given without conflicts. Job arrival is simulated using exponential arrival times resulting in a Poisson process. Experiments use exponential job arrival times of 250 s for extreme contention, 500 s for moderate contention and 1000 s for no contention. Across all strategies, the extreme contention workload peaks at 125 simultaneous jobs, the moderate workload at 59 simultaneous jobs, and the no contention workload at 20 simultaneous jobs. The total number of jobs are 206, 114, and 44 respectively. Results are shown for these arrival times on a simulated 64 GPU cluster. The eight GPU arrival time is 2.1 times worse than the exploratory scheduling strategy in the moderate contention workload. The exploratory algorithm is forced to make an explore-optimize tradeoff which works poorly under extreme contention. Similarly, in the zero contention case, the exploration cost underperforms the eight GPU allocation because of the 7.5 minutes spent using less than all eight of the GPUs per job. Regardless, the moderate contention case is consistent with an expected grid workload and in this case both the exploratory and precompute strategies perform well. When precomputing is feasible, the precompute algorithm always outperforms or ties other strategies.

The scheduling algorithm itself may execute the logic of FIGS. 1, 5A, 5B, 6A, and/or 6B when running on, for example, a GPU, TPU, or CPU executing software performing the logic of the cited figures.

Embodiments provided herein demonstrate the feasibility of better scheduling algorithms for ring architectures, and provide a candidate algorithm based on a new doubling heuristic with good performance in simulation. In particular, results show over double the performance in moderate contention environments. The advances show that communication aware scheduling of ring architecture jobs can improve cluster utilization.

The invention claimed is:

1. A method of scheduling a plurality of jobs to a plurality of processing units (PUs), wherein the plurality of jobs comprises J jobs, the J being two or more, and the plurality of PUs comprises C PUs, the C being two or more, the method comprising:
   initializing by provisionally assigning one PU to each job of the plurality of jobs; and
   iteratively identifying and provisionally assigning to determine an allocation from the plurality of PUs to the plurality of jobs, wherein the iteratively identifying and the provisionally assigning, within an iteration, comprises:
   at a first step within the iteration, identifying a greatest Time Improvement for running of job per PU based on a doubling heuristic for providing with a doubling of a number of PUs assigned, wherein the iteratively identifying identifies, at the first step within the iteration, that the greatest Time Improvement is associated with a particular job of the iteration, at a second step within the iteration, provisionally assigning to the particular job of the iteration, an additional first number of PUs, wherein the additional first number of PUs doubles a number of PUs provisionally assigned to the particular job of the iteration, and stopping the iteratively identifying and the provisionally assigning when a stopping condition is reached, wherein the stopping condition comprises a condition that no more PUs can be further provisionally assigned to any job of the plurality of jobs, wherein the Time Improvement is determined based on the number of PUs assigned to a $j^{th}$ job, training speed function of the $j^{th}$ job and estimated number of epochs needed to complete the $j^{th}$ job, wherein an epoch corresponds to one set of training data, and wherein j is evaluated from 1, ..., J within any iteration.

2. The method of claim 1, wherein the Time Improvement is of a form $$\text{Time Improvement} = \frac{1}{g_j}\left(\frac{Q_j}{f(g_j)} - \frac{Q_j}{f(2*g_j)}\right),$$

wherein $f(g_j)$ is a training speed function of the $j^{th}$ job, and $Q_j$ is an estimated number of epochs needed to complete the $j^{th}$ job, wherein g1 PUs are configured to use a message passing protocol in a ring fashion, and wherein 1 is the number of PUs assigned to a first job.

3. The method of claim 2, wherein the scheduling for the plurality of jobs is configured to implement a stochastic gradient descent (SGD) algorithm to update neural network weights.

4. The method of claim 3, wherein the scheduling for the plurality of jobs is configured to update the neural network weights in part using a ring-based message passing algorithm.

5. The method of claim 4, wherein the scheduling for the plurality of jobs is configured to update the neural network weights using an allreduce algorithm.

6. The method of claim 4, further comprising:
assigning each of provisionally assigned PUs to PUs of a cluster, thereby assigning a first number of PUs to the first job and a second number of PUs to a second job of the plurality of jobs; and
running, at a first time, the J jobs on the cluster, wherein the running comprises:
performing the SGD algorithm for each job for at least a first training interval, and
outputting weights for any job which has reached a second stopping condition.

7. The method of claim 1, wherein the plurality of PUs comprises a plurality of graphics processing units (GPUs).

8. The method of claim 1, wherein the plurality of PUs comprises a plurality of tensor processing units (TPUs).

9. The method of claim 1, wherein the plurality of PUs comprises a plurality of central processing units (CPUs).

10. The method of claim 6, wherein each of the first number of PUs and the second number of PUs is chosen from a first set,
wherein the first set is a set of powers of two greater than or equal to 1: $\{1, 2^1, 2^2, 2^3, \ldots\}$.

11. The method of claim 4, further comprising:
assigning each of provisionally assigned PUs to PUs of a cluster, thereby assigning a first number of PUs to the first job and a second number of PUs to a second job of the plurality of jobs;
launching, at a first time, the J jobs on the cluster, wherein the launching comprises performing the SGD algorithm for each job for at least a first interval;
stopping, after elapse of a predetermined interval measured from the first time, the SGD algorithm for each job;
performing, based on data accumulated during the performing the SGD algorithm: a second initializing,
a second iteratively identifying and provisionally assigning to determine a second allocation from the plurality of PUs to the plurality of jobs, and
re-starting the SGD algorithm for each job with the second allocation from the plurality of PUs.

12. The method of claim 11, wherein the predetermined interval is ten minutes.

13. The method of claim 11, wherein the predetermined interval is one hour.

14. A method using an inner sequence of iterations within an outer sequence of iterations in a nested fashion, wherein a plurality of jobs comprises J jobs, the J being two or more, and a plurality of processing units (PUs) comprises C PUs and the C being two or more, the method comprising:
during an outer iteration of the outer sequence of iterations:
estimating a number of remaining epochs required to complete each job of the plurality of jobs;
estimating a training speed function for each job of the plurality of jobs; provisionally assigning one PU to each job of the plurality of jobs; iteratively identifying and provisionally assigning to determine an allocation from the plurality of PUs to the plurality of jobs, in the nested fashion within the outer iteration, wherein the identifying and the provisionally assigning, within an inner iteration of the inner sequence of iterations, comprises:
at a first step within the inner iteration, identifying a greatest Time Improvement for running of job per PU based on a doubling heuristic for providing with a doubling of a number of PUs assigned, wherein the iteratively identifying identifies, at the first step within the inner iteration, that the greatest Time Improvement is associated with a particular job of the inner iteration,
at a second step within the inner iteration, provisionally assigning to the particular job of the inner iteration, an additional first number of PUs, wherein the additional first number of PUs doubles a number of PUs provisionally assigned to the particular job of the inner iteration, and
stopping the iteratively identifying and the provisionally assigning when a stopping condition is reached, wherein the stopping condition comprises a condition that no more PUs can be further provisionally assigned to any job of the plurality of jobs;
assigning each of the provisionally assigned PUs from a conclusion of a most recent inner iteration to PUs of a cluster;
launching or re-starting the J jobs on the cluster, wherein the launching comprises performing a stochastic gradient descent (SGD) algorithm for each job for at least a first interval;
outputting weights for any job which has reached a second stopping condition; stopping, after elapse of a predetermined interval measured from the launching or restarting, the SGD algorithm for any job which has not reached the second stopping condition; and
beginning a next outer iteration.

15. The method of claim 14, wherein the Time Improvement is of a form $$\text{Time Improvement} = \frac{1}{g_j}\left(\frac{Q_j}{f(g_j)} - \frac{Q_j}{f(2*g_j)}\right),$$

wherein $f(g_j)$ is a training speed function of the $j^{th}$ job, and $Q_j$ is an estimated number of epochs needed to complete the $j^{th}$ job, wherein the g1 PUs are configured to use a message passing protocol in a ring fashion, and wherein g1 is the number of PUs assigned to a first job.

16. A device for scheduling a plurality of jobs to a plurality of processing units (PUs), wherein the plurality of jobs comprises J jobs, the J being two or more, and the plurality of PUs comprises C PUs, the C being two or more, the device comprising: one or more processors; and
one or more memories, wherein the one or more memories store instructions, wherein execution of the instructions by the one or more processors causes the device to:
initialize by provisionally assigning one PU to each job of the plurality of jobs, and
iteratively identify and provisionally assign to determine an allocation from the plurality of PUs to the plurality of jobs, by:
at a first step within the iteration, identifying a greatest Time Improvement for PUs based on a doubling heuristic for providing with a doubling of a number of PUs assigned, wherein the iteratively identifying identifies, at the first step within the iteration, that the greatest Time Improvement is associated with a particular job of the iteration,
at a second step within the iteration, provisionally assigning to the particular job of the iteration, an additional first number of PUs, wherein the additional first number of PUs doubles a number of PUs provisionally assigned to the particular job of the iteration, and
stopping the iteratively identifying and the provisionally assigning when a stopping condition is reached, wherein the stopping condition comprises a condition that no more PUs can be further provisionally assigned to any job of the plurality of jobs,
wherein the Time Improvement is determined based on the number of PUs assigned to a $j^{th}$ job, training speed function of the jth job and estimated number of epochs needed to complete the $j^{th}$ job, wherein an epoch corresponds to one set of training data, and wherein j is evaluated from 1, . . . , J within any iteration.

17. An application specific integrated circuit (ASIC) for scheduling a plurality of jobs to a plurality of processing units (PUs), wherein the plurality of jobs includes J jobs, the J being two or more, and the plurality of PUs comprises C PUs, the C being two or more, the ASIC configured to:
initialize by provisionally assigning one PU to each job of the plurality of jobs; and
iteratively identify and provisionally assign to determine an allocation from the plurality of PUs to the plurality of jobs, by:
at a first step within the iteration, identifying a greatest Time Improvement for running of job per PU based on a doubling heuristic for providing with a doubling of a number of PUs assigned, wherein the iteratively identifying identifies, at the first step within the iteration, that the greatest Time Improvement is associated with a particular job of the iteration,
at a second step within the iteration, provisionally assigning to the particular job of the iteration, an additional first number of PUs, wherein the additional first number of PUs doubles a number of PUs provisionally assigned to the particular job of the iteration, and
stopping the iteratively identifying and the provisionally assigning when a stopping condition is reached, wherein the stopping condition comprises a condition that no more PUs can be further provisionally assigned to any job of the plurality of jobs,
wherein the Time Improvement is determined based on the number of PUs assigned to a $j^{th}$ job, training speed function of the $j^{th}$ job and estimated number of epochs needed to complete the $j^{th}$ job, wherein an epoch corresponds to one set of training data, and wherein j is evaluated from 1, . . . , J within any iteration.

* * * * *